United States Patent
Wigren

(10) Patent No.: US 12,003,294 B2
(45) Date of Patent: Jun. 4, 2024

(54) CONTROL OF EIRP OF A RADIO BASE STATION

(71) Applicant: Telefonaktiebolaget LM Ericsson (publ), Stockholm (SE)

(72) Inventor: Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 338 days.

(21) Appl. No.: 17/594,065

(22) PCT Filed: Apr. 2, 2019

(86) PCT No.: PCT/SE2019/050300
§ 371 (c)(1),
(2) Date: Sep. 30, 2021

(87) PCT Pub. No.: WO2020/204773
PCT Pub. Date: Oct. 8, 2020

(65) Prior Publication Data
US 2022/0166478 A1    May 26, 2022

(51) Int. Cl.
*H04L 5/12* (2006.01)
*H04B 7/0456* (2017.01)
*H04B 7/06* (2006.01)
*H04B 17/10* (2015.01)
*H04W 52/36* (2009.01)
*H04W 72/044* (2023.01)

(52) U.S. Cl.
CPC ......... *H04B 7/0617* (2013.01); *H04B 7/0465* (2013.01); *H04B 17/102* (2015.01); *H04W 52/367* (2013.01); *H04W 72/0473* (2013.01)

(58) Field of Classification Search
CPC .. H04B 7/0617; H04B 17/102; H04B 7/0465; H04W 52/367; H04W 72/0473
USPC ................ 375/262, 261, 259, 219, 295, 316
See application file for complete search history.

(56) References Cited

U.S. PATENT DOCUMENTS 6,453,177 B1   9/2002   Wong et al.
2014/0077997 A1*   3/2014   Vermani .............. H04B 7/0408
                                                            342/374

(Continued)

FOREIGN PATENT DOCUMENTS

WO        2018/056876 A1     3/2018

OTHER PUBLICATIONS

International Search Report and Written Opinion for Application No. PCT/SE2019/050300, dated Nov. 20, 2019, 13 pages.

(Continued)

*Primary Examiner* — Zewdu A Kassa
(74) *Attorney, Agent, or Firm* — Nicholson De Vos Webster & Elliott LLP

(57) ABSTRACT

Mechanisms for controlling average Equivalent Isotropic Radiated Power (EIRP) of a radio base station, in which a method is performed by a control device. The method comprises performing control of average EIRP of the radio base station according to a back-off power density control loop. In the back-off power density control loop, a beam width control parameter is used to vary the average EIRP generated by an antenna array of the radio base station, whereby the average EIRP is selectively reduced based on the beam width control parameter.

17 Claims, 8 Drawing Sheets

(56) References Cited

U.S. PATENT DOCUMENTS

2014/0307704 A1* 10/2014 Arogyaswami ...... H04B 17/102
370/330
2017/0117950 A1 4/2017 Strong

OTHER PUBLICATIONS

Communication pursuant to Article 94(3) EPC, EP App. No. 19717633.2, Nov. 20, 2023, 9 pages.

* cited by examiner

CONTROL OF EIRP OF A RADIO BASE STATION

CROSS-REFERENCE TO RELATED APPLICATIONS

This application is a National stage of International Application No. PCT/SE2019/050300, filed Apr. 2, 2019, which is hereby incorporated by reference.

TECHNICAL FIELD

Embodiments presented herein relate to a method, a control device, a computer program, and a computer program product for controlling average equivalent isotropic radiated power (EIRP) of a radio base station.

BACKGROUND

When any radio equipment is to be deployed, regulatory radio frequency (RF) electromagnetic field (EMF) exposure requirements should be accounted for. These RF EMF exposure regulations may typically be based on international guidelines and standards from for example the International Commission on Non-Ionizing Radiation Protection (IC-NIRP) but may take different forms in some countries and regions. An aim of the RF EMF exposure regulations is to secure that the human exposure to RF energy is kept within prescribed limits, which typically have been set with wide safety margins.

Some newly developed base stations and other radio equipment are equipped with so-called advanced antenna systems (AAS). These antenna systems increase the capacity and/or coverage compared to traditionally used antenna system by addition of one or more antenna arrays. In turn, this enables the simultaneous transmission of parallel data streams between a base station on the network side and a terminal device at the user-side by means of so-called multiple-input-multiple-output (MIMO) transmission.

For base stations and other radio equipment having AAS systems with a large number of transmitters in order to achieve a high directivity, when emissions are correlated between the transmitters then there could be a large beamforming gain. A consequence of increasing beamforming gain is that the radiated energy is concentrated in directional beams, in which the Equivalent Isotropic Radiated Power (EIRP), i.e. the power radiated from an antenna with unity antenna gain in all directions, is increased as compared to the situation without AAS systems.

The RF EMF exposure limits are typically expressed in terms of power density (in units of $W/m^2$) which in the far field is proportional to the EIRP. Consequently, the EIRP can be used to determine the power density in the far field. This implies that the experienced momentary EIRP, and the resulting power density at a given distance from the antenna, will be higher in a beam generated by an AAS system with beam forming gain, than without such an AAS system.

The ICNIRP and other RF EMF exposure limitations are commonly expressed as an average power density over a specified time interval T. This means that the momentary power density can be significantly higher during a shorter time than T, however the time-averaged power density over any time period T must be below the specified limit. To maintain a certain RF EMF exposure compliance distance (or boundary), that is shorter (or smaller) than what is obtained using the maximum EIRP of the AAS, the time-averaged power needs to be maintained at or below a pre-determined threshold or a set of pre-defined thresholds for different beam directions.

Hence, there may be a need for efficient control of the average EIRP for base stations and other radio equipment.

SUMMARY

An object of embodiments herein is to provide efficient control of the average EIRP for base stations and other radio equipment.

This objective is generally solved by mechanisms performed by a control device for controlling total average transmission power of a radio base station.

According to a first aspect there is presented a method for controlling average EIRP of a radio base station. The method is performed by a control device. The method comprises performing control of average EIRP of the radio base station according to a back-off power control loop. In the back-off power control loop, a beam width control parameter is used to vary the EIRP generated by an antenna array of the radio base station, whereby the average EIRP is selectively reduced based on the beam width control parameter.

According to a second aspect there is presented a control device for controlling average EIRP of a radio base station. The control device comprises processing circuitry. The processing circuitry is configured to cause the control device to perform control of average EIRP of the radio base station according to a back-off power control loop. In the back-off power control loop, a beam width control parameter is used to vary the EIRP generated by an antenna array of the radio base station, whereby the total average EIRP is selectively reduced based on the beam width control parameter.

According to a third aspect there is presented a control device for controlling average EIRP of a radio base station. The control device comprises a control module. The control module is configured to perform control of average EIRP of the radio base station according to a back-off power control loop. In the back-off power control loop, a beam width control parameter is used to vary the maximum EIRP generated by an antenna array of the radio base station, whereby the average EIRP is selectively reduced based on the beam width control parameter.

According to a fourth aspect there is presented a computer program for controlling average EIRP of a radio base station, the computer program comprising computer program code which, when run on a control device, causes the control device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this method, these control devices, this computer program and this computer program product enable efficient control of the average EIRP of the base station.

Advantageously this method, these control devices, this computer program and this computer program product reduces capacity losses of the back-off power controller.

Advantageously this method, these control devices, this computer program and this computer program product improves stability of the back-off power controller.

Advantageously this method, these control devices, this computer program and this computer program product enable uniform behavior of the back-off power control loop for different averaging times.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
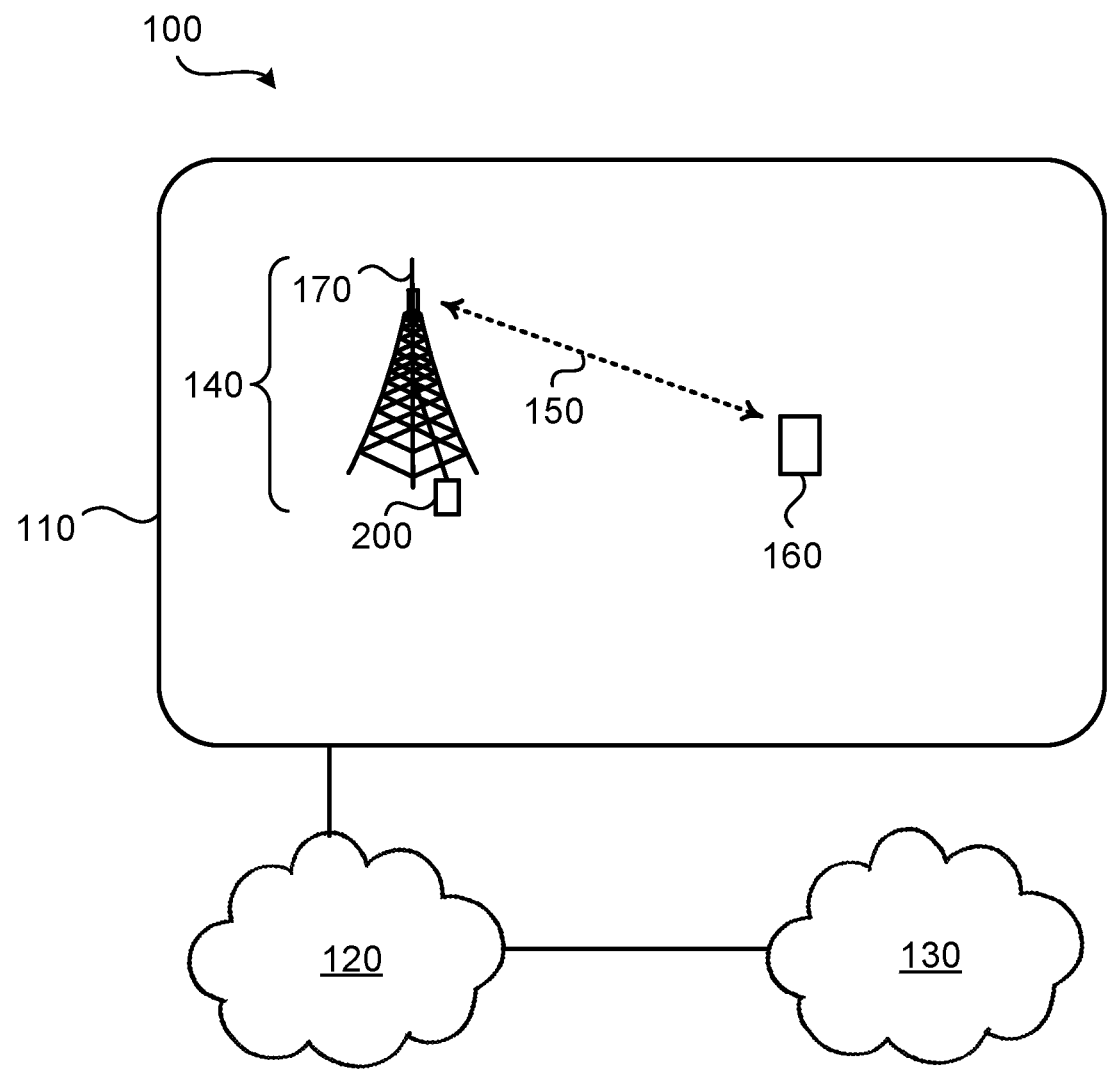
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a control node 200 configured to control an antenna array 170 of a radio base station 140 that provides network access to at least one terminal device 160 in a radio access network 110, thus enabling the terminal device 160 to communicate over a wireless link 150. The radio access network 110 is operatively connected to a core network 120. The core network 120 is in turn operatively connected to a service network 130, such as the Internet. The terminal device 160 is thereby enabled to, via the radio base station 140, access services of, and exchange data with, the service network 130.

Examples of radio base stations 140 are radio access network nodes, base transceiver stations, Node Bs, evolved Node Bs, g Node Bs, access points, and access nodes, and backhaul nodes. Examples of terminal devices 160 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The control node 200 might comprise, be collocated with, integrated with, or be in operational communications with, the radio base station 140.

Figure 2:
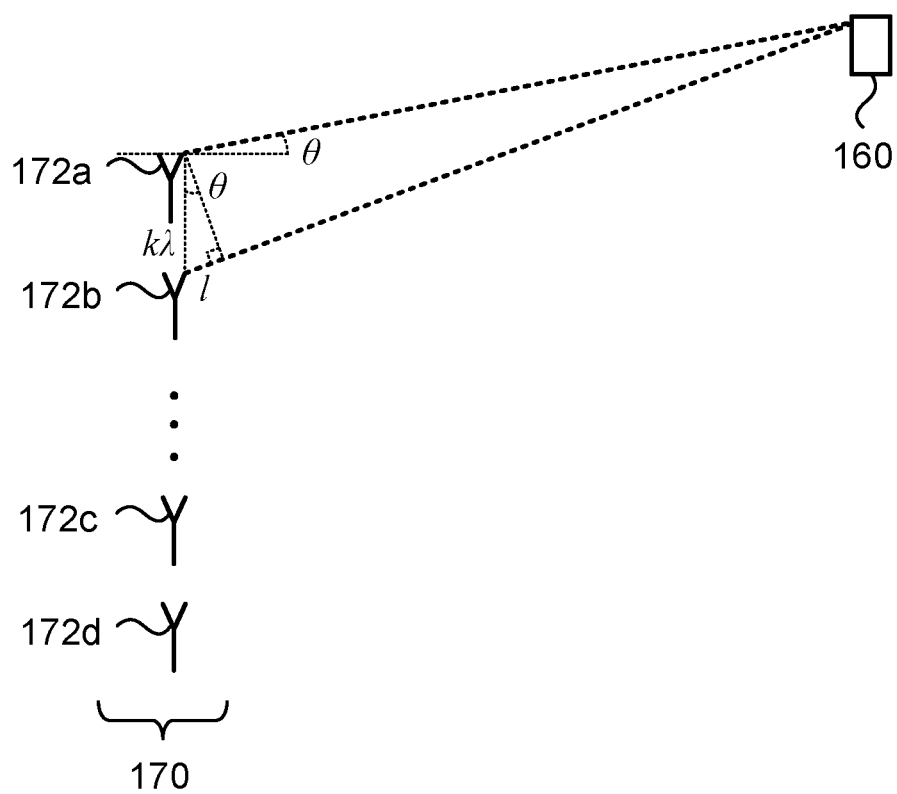
FIG. 2 schematically illustrates beamformed communication between an antenna array of a radio base station and a terminal device according to an embodiment.

FIG. 2 schematically illustrates an idealized one-dimensional beamforming case. In case it is assumed that the terminal device 160 is located far away from the antenna array 170, i.e. in the far-field, it follows that the difference in travel distance of radio waves from the antenna array 170 to the terminal device 160, between adjacent antenna elements 172a, 172b, 172c, 172d of the antenna array 170, is:

$$l = k\lambda \sin(\theta),$$

where $k\lambda$ is the antenna element separation. Here $\lambda$ is the carrier wavelength, k is the separation factor which may be 0.5-0.7 in a typical correlated antenna element arrangement. This means that if a reference signal $s_i e^{j\omega t}$ is transmitted from the radio base station 140, it will be received at the terminal device 160 as a weighted sum:

$$S_{UE} = \sum_{i=0}^{N-1} s_i h_i e^{j\omega\left(t - \frac{il}{c}\right)} = e^{j\omega t} \sum_{i=0}^{N-1} s_i h_i e^{-2\pi jki\sin(\theta)}.$$

Here $\omega$ is the angular carrier frequency, $h_i$ is the complex channel from the i:th antenna element, t is the time. In the above equation $\theta$ and $h_i$ are unknown. In case of a feedback solution, the terminal device 160 therefore needs to search for all complex channel coefficients $h_i$ and the unknown angle $\theta$.

In some aspects the radio base station 140 is configured to perform beamforming using a beamformer. The beamformer is defined by a beam forming matrix W. There could be different ways to determine W. One way is to use Reciprocity Assisted Transmission (RAT). RAT is based on channel reciprocity.

In general terms, channel reciprocity is a consequence of Maxwell's Equations; given two nodes each equipped with an antenna array that is configured to communicate in a single frequency band, the channel reciprocity property means that at any given point in time, the complex radio propagation channel coefficient between any transmitting antenna element in one node and any receiving antenna element in the other node is the same (to within a transpose) in the uplink and the downlink. The channel matrix hence essentially remains the same between the antenna arrays of the two nodes when the direction of the transmission is reversed. The two nodes may typically be a radio base station 140 and terminal device 60. The point in time is assumed to be the same for the two directions of transmission.

To exploit reciprocity, the channel coefficients can be directly estimated by the network node from uplink transmission of known pilot signals (for example so called sounding reference signals, SRSs) from the terminal device 160. These signals are available in both the 4G and 5G standards. The estimated channel can then be used to compute the combining weight matrix with a selected principle, and then used for downlink transmission. This works since the uplink and downlink channels are the same (to within a transpose) when reciprocity is valid.

To express the requirements on the beamforming weights W for RAT, a desired situation can be expressed by the equation:

$$\hat{H}W + \tilde{H}W = I,$$

which is valid for an arbitrary number of terminal devices 160 and antenna elements 172a:172d. As is evident for anyone skilled in the art, two-dimensional antenna arrays can also be handled and the antenna configuration of FIG. 2 should not be considered as limiting the scope of the present disclosure. In the above equation, $\hat{H}$ is the estimated radio propagation channel of dimension Nrx-by-Ntx, where Nrx is the total number of receive antennas at the terminal device 160, and where Ntx is the number of antenna elements 172a:172d at the antenna array 170 of the radio base station 160. Further, $\tilde{H}$ is the channel estimation error, assumed to have covariance matrix $\Gamma$. In order to find the beam weights, a minimum mean squared error (MMSE) criterion is used with the expected value $E\{WW^H\}=I$ such that the MMSE estimate of W becomes:

$$W = \hat{H}(\hat{H}\hat{H}^H + \Gamma)^{-1}.$$

As mentioned above there is a need for efficient control of the average EIRP for base stations and other radio equipment.

In particular, currently thresholding of the fraction of physical resource blocks (PBRs) that can be used at each point in time for scheduling of downlink data traffic is used for controlling the power back-off. Downlink control traffic is kept unaffected to minimize impacts on cell coverage. The effect of the PRB limitation is, when it is active, to reduce the total momentary transmit power with cell scope—wide level. In this way the dynamic PRB limitation introduced in the scheduler acts as a dynamic actuator, for control of the total T-minute average transmitted power, which is directly related to the regulatory quantity of interest for RF EMF exposure limitations.

It has by the inventor of the present disclosure been noted that the power density, which is the final quantity that is specified in RF EMF exposure standards and regulations, is proportional to the EIRP which is the product of the transmit power in a direction and the beam gain in the direction, i.e.

$$S(\theta) \sim P(\theta)G(\theta),$$

where $S(\theta)$ is the power density at a certain distance in the direction $\theta$, $P(\theta)$ is the transmit power in direction $\theta$ and $G(\theta)$ is the beam gain in direction $\theta$.

Figure 3:
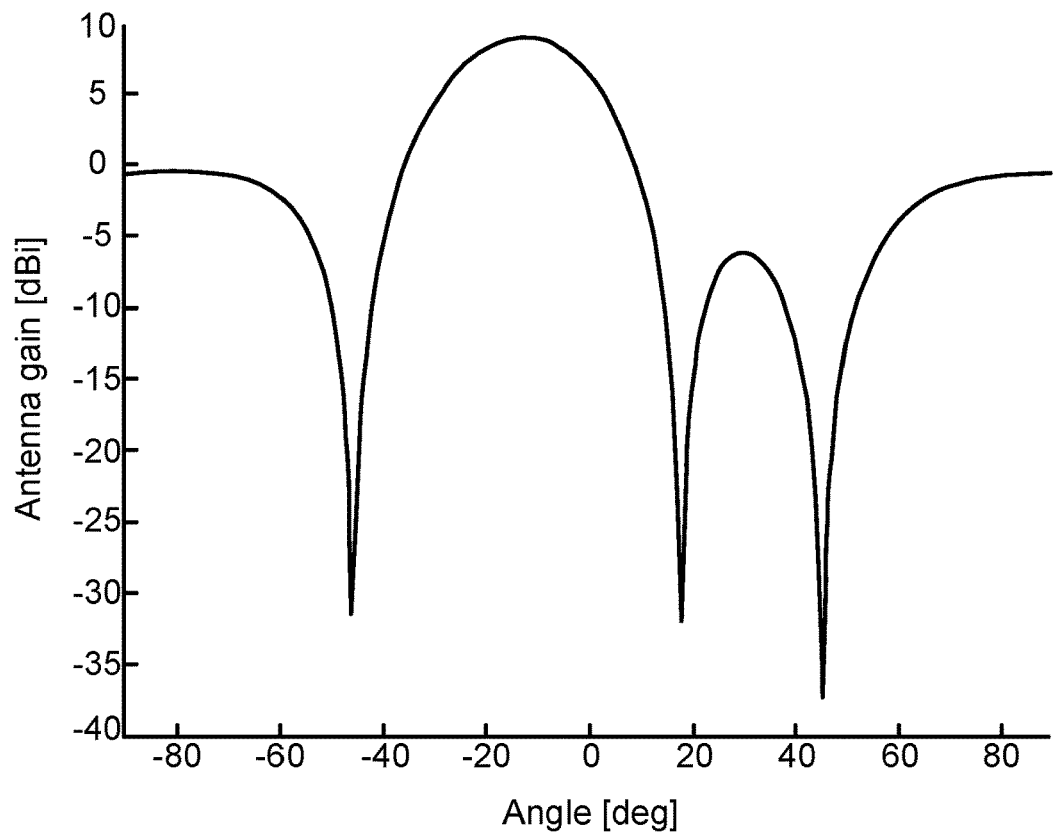
FIGS. 3 and 4 schematically illustrate antenna gain according to an embodiments.

It is noted that a beamformer with a beam forming matrix W determined according to the above might have close to zero gain in the direction of interfered terminal devices (i.e., in the directions towards terminal devices served by another radio base station). This means that in the spatial antenna frequency domain, zeros are placed on or close to the unit circle, from which the antenna diagram is produced. The presence of zeros on or close to the unit circle means that the beam forming matrix W coefficients, viewed as a spatial polynomial, also has zeros on or close to the unit circle. This in turn is so since the channel matrix coefficients have zeros on or close to the unit circle when the radio propagation channel is close to flat, since equation for the beam forming matrix W is proportional to H. FIG. 3 schematically illustrates an example antenna diagram experiencing this effect. In more detail, FIG. 3 schematically illustrates the antenna gain for a flat radio propagation channel with a served terminal device located at −12 degrees and an interfered (i.e., not served) terminal device located at +43 degrees. As can be seen, a beam is generated with 9 dBi gain towards the served terminal device and a very narrow null with a gain of almost −40 dBi is generated in the direction of the interfered terminal device.

According to at least some of the herein disclosed embodiments a modified channel matrix is used such that that the zeros of the radio propagation channel model are moved inside the unit circle, to another circle with radius less than one (or moved outside the unit circle, to another circle with radius larger than one). This secures that there is always a final distance in the complex plane from the unit circle to the zero. In turn, this prevents an exactly zero antenna gain corresponding to the zero.

Figure 4:
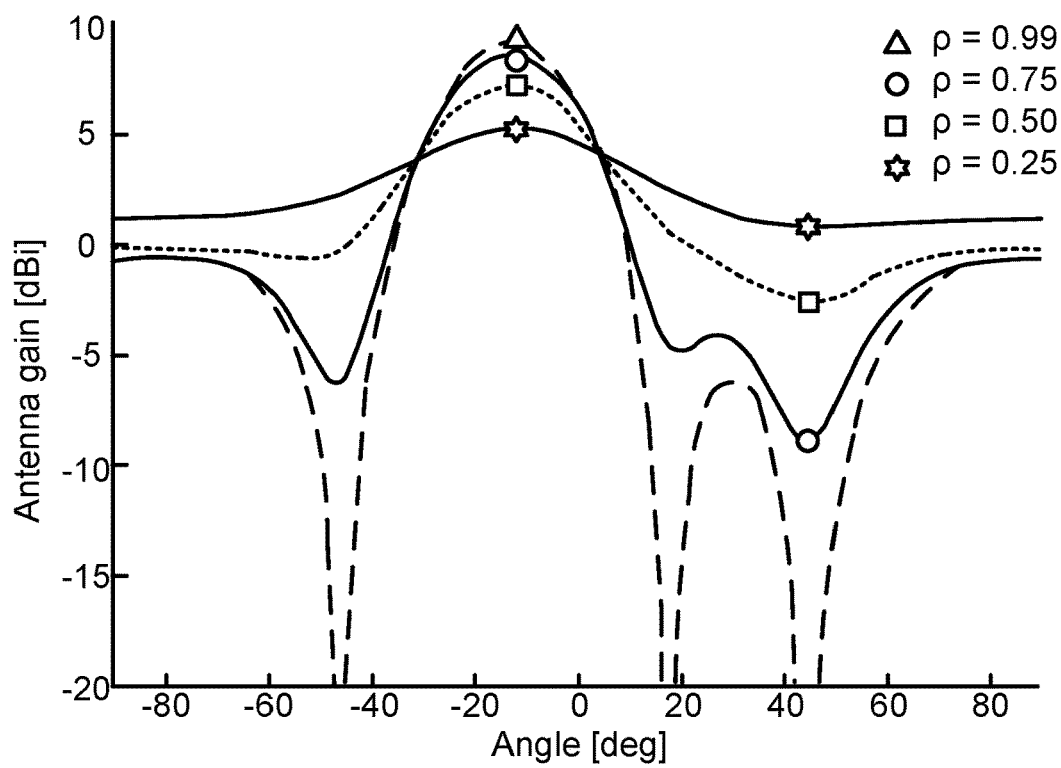

The widening of the null can be accompanied with a (non-linear) reduction of the beam gain in the transmission direction. This effect is illustrated in FIG. 4. As will be further disclosed below, the widening can be achieved by the use of a beam width control parameter p. In more detail, FIG. 4 illustrates how the beam gain can be varied by the use of different values of beam width control parameter $\rho$, for $\rho=0.99$, $\rho=0.75$, $\rho=0.50$ and $\rho=0.25$. The beam gain reduction is not linear and does amount to 4 dBi (decibel isotropic) in this example.

The embodiments disclosed herein thus relate to mechanisms for controlling the EIRP of a radio base station 140, by controlling the antenna gain factor of $(\theta)\sim P(\theta)G(\theta)$. In order to obtain such mechanisms there is provided a control device 200, a method performed by the control device 200, a computer program product comprising code, for example in the form of a computer program, that when run on a control device 200, causes the control device 200 to perform the method.

Figure 5:
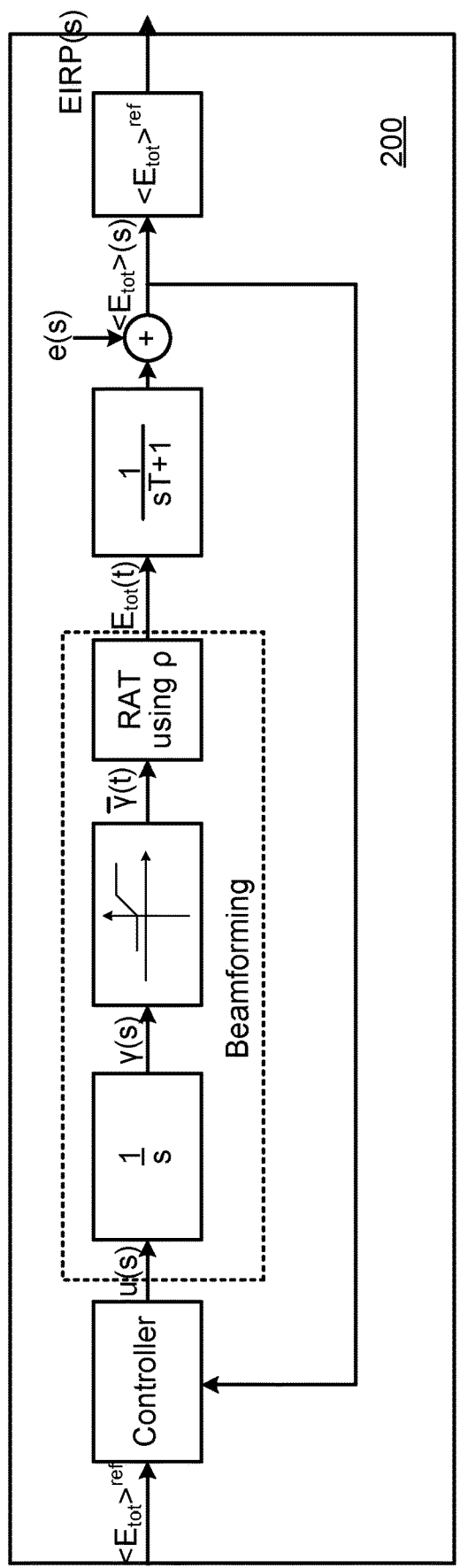
FIG. 5 is a block diagram of a control device according to an embodiment.

FIG. 5 is a block diagram of the control node 200 where feedback control has been enabled by a back-off power control loop. In FIG. 5, $\langle E_{tot} \rangle^{ref}$ denotes the setpoint for the averaged EIRP (typically slightly less than the threshold value), 1/s denotes the actuator dynamics with any lower and upper limits inactive, $\bar{\gamma}(s)$ denotes the beam gain limitation after any lower and upper limitation, $1/(sT+1)$ represents an autoregressive simplified model of the averaging of power, where T is the averaging time, $\langle E_{tot} \rangle(s)$ denotes the averaged EIRP. All quantities are in FIG. 5 expressed in the Laplace transform domain, which is allowed since the feedback control mechanism design is performed with constraints inactive.

In some aspects the controller block is given by:

$$u(s) = CT(1+T_D s)(\langle E_{tot} \rangle^{ref} - \langle E_{tot} \rangle(s)).$$

A control node 200 implementing this controller block is of proportional-derivative (PD) type. C denotes the proportional gain, and $T_D$ the differentiation time. To implement the feedback control mechanism, $\langle E_{tot} \rangle^{ref}$, $\langle E_{tot} \rangle$(t) and $\langle \dot{E}_{tot} \rangle$(t) are needed. The first two quantities can be obtained by configuration and averaging of measured spectral density's by C, while the second quantity needs to be estimated. This can e.g. be achieved by autoregressive filtering of $\langle E_{tot} \rangle$(t) with the filter:

$$\langle \dot{E}_{tot}\rangle(s) = \frac{as}{s+\alpha}\langle E_{tot}\rangle(s),$$

where $\alpha$ is a filter parameter.

In order to further emphasize the back-off control performance it could be advisable to only allow differential control action that reduces a resource factor value $\gamma(t)$ (corresponding to a beam gain threshold), meaning that only negative contributions from the second term of the feedback mechanism should be allowed. This means that in the time domain, the following restriction to the derivative $\langle \dot{E}_{tot} \rangle$(t) might be applied:

$$u(t)=CT(\langle E_{tot}\rangle^{ref}- \langle E_{tot}\rangle(t))-CTT_D \max$$
$$(0, \langle \dot{E}_{tot}\rangle(t)).$$

It might occur that the feedback control mechanism is not fast enough to prevent a small overshoot of the threshold value. To prevent this from occurring, a hard back-off might be superimposed over the herein disclosed feedback control mechanism. In some aspects this hard back-off operates by setting the resource factor value $\gamma(t)$ to its minimum value $\gamma_{low}$ whenever the following holds:

$$\langle E_{tot}\rangle(t)>\text{margin}\cdot EIRP_{threshold}$$

where margin is a value slightly below 1 and where $EIRP_{threshold}$ is the maximum averaged EIRP determined to meet a regulatory requirement. Further aspects of the resource factor value $\gamma(t)$ will be disclosed below.

Figure 6:
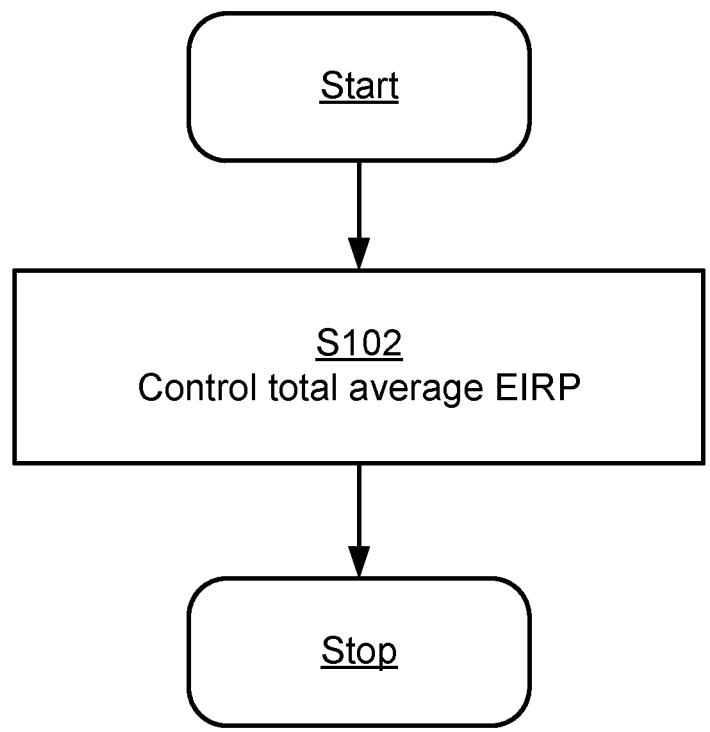
FIG. 6 is a flowchart of methods according to embodiments.

FIG. 6 is a flowchart illustrating embodiments of methods for controlling total average transmission power density of a radio base station 140. The methods are performed by the control device 200. The methods are advantageously provided as computer programs 1320.

S102: The control device 200 performs control of average EIRP $\langle E_{tot}\rangle$(t) of the radio base station 140 according to a back-off power control loop.

In the back-off power control loop, a beam width control parameter $\rho$ is used to vary the (maximum) EIRP generated by the antenna array 170 of the radio base station 140, whereby the average EIRP $\langle E_{tot}\rangle$(t) is selectively reduced based on the beam width control parameter $\rho$.

Embodiments relating to further details of controlling average EIRP of a radio base station 140 as performed by the control device 200 will now be disclosed.

In some aspects the beam gain reduction provides an actuator effect. In particular, according to an embodiment, application of the beam width control parameter p to vary the maximum power density gives rise to a beam gain varying actuator that provides an actuator effect to vary the EIRP.

The beam gain varying actuator might be implemented by weighting the beam forming matrix W. Particularly, according to an embodiment, the beam width control parameter $\rho$ is used to weigh the beam forming matrix W, and thereby to vary the EIRP.

There could be different ways to weigh the beam forming matrix W. According to an embodiment, weighting of the beam forming matrix W is accomplished by weighting of the estimated channel matrix $\hat{H}$ with the beam width control parameter $\rho$. Denote the estimated channel matrix as being weighted by the beam width control parameter $\rho$ as $\check{H}$. Then, $\check{H}$ could be determined from $\hat{H}$ and $\rho$ as:

$$\check{H}=Po\hat{H},$$

where o is the Hadamard matrix operator, and P is a matrix defined from $\rho$. The Hadamard matrix operator could in its simplest form express elementwise matrix multiplication between the elements in P and $\hat{H}$.

Thus, $\check{H}$ would replace all occurrences of $\hat{H}$ when determining W. There could be different ways to determine W based on $\check{H}$. As disclosed above, RAT might be applied to, based on an estimated channel matrix $\hat{H}$, determine the beam forming matrix W. Then, with $\check{H}$ replacing all occurrences of $\hat{H}$, the MMSE estimate of W for RAT becomes:

$$W=\check{H}(\check{H}\check{H}^H+\Gamma)^{-1}.$$

There could be different ways to define P from $\rho$. In some examples P consists of elements being powers of $\rho$. In particular, according to an embodiment, P is a matrix defined from $\rho$ as:

$$P = \begin{pmatrix} \rho^0 & \rho^1 & \cdots & \rho^{Ntx} \\ \vdots & \vdots & \ddots & \vdots \\ \rho^0 & \rho^1 & \cdots & \rho^{Ntx} \end{pmatrix},$$

where the estimated channel matrix $\hat{H}$ has dimension Nrx-by-Ntx. One typical element of $\check{H}$ as expressed in polar form is then:

$$\check{H}_{r,t}=\rho^\alpha\gamma \exp(2\pi ik \sin(\theta_{rx})t),$$

where exp(x) denotes the exponential function with argument x.

It could be that $|\rho|<1$ in the matrix P. However, having $|\rho|>1$ would have a similar effect and $|\rho|>1$ can be used as well. Further, P might be a matrix consisting of elements that have values that are powers of a mix of values of $|\rho|<1$ and $|\rho|>1$. This might improve the general balancing of the beamforming computations.

In line with what has been disclosed above with reference to FIG. 5, according to an embodiment, performing the control involves determining a resource factor value $\gamma(t)$ according to which the average EIRP of the radio base station 140 is to be limited. The resource factor value $\gamma(t)$ might then define a momentary beam gain reduction value.

Further, in some aspects, the beam width control parameter $\rho$ is dependent on the resource factor value $\gamma(t)$.

In this respect, according to a first embodiment, the beam width control parameter $\rho$ is found from the resource factor value $\gamma(t)$ by a table look-up. In more detail, as is evident from the example of FIG. 4, the beam gain reduction with $\rho$ is not linear. As an illustrative example, the values resulting from the examples in above referred FIGS. 3 and 4 are provided in Table 1. It is also likely that the beam gain reduction varies with the degree of multipath affecting the channel matrix. The beam gain reduction for the antenna array 170 at hand might be tabulated as a function of $\rho$. Then the tabulated value could be used to determine the EIRP reduction where the beam forming computation is performed. This would provide a far better accuracy than a linear approximation.

TABLE 1

Values of beam width control parameter ρ, gain, and
gain reduction factor for the examples in FIGS. 3 and 4.

| ρ | Gain | Gain reduction factor |
|---|---|---|
| 1.00 | 9.0 | 1.00 |
| 0.90 | 8.9 | 0.99 |
| 0.80 | 8.7 | 0.93 |
| 0.70 | 8.3 | 0.85 |
| 0.60 | 7.8 | 0.76 |
| 0.50 | 7.2 | 0.66 |
| 0.40 | 6.4 | 0.55 |
| 0.30 | 5.6 | 0.46 |
| 0.20 | 3.8 | 0.38 |
| 0.10 | 3.9 | 0.31 |

Further in this respect, according to a second embodiment, the beam width control parameter ρ is identical to, or a continuous function of, the resource factor value $\gamma(t)$. Thereby, a dynamic integrating threshold quantity, given by the resource factor value $\gamma(t)$, can be controlled that sets the momentary beam gain reduction fraction.

There could be different types of controllers used in step S102.

As disclosed above, in some aspects the controller is of proportional-derivative (PD) type. That is, according to an embodiment the control in step S102 is of PD type.

As also disclosed above, in some aspects the controller is of derivative (D) type. That is, according to an embodiment the control in step S102 is of D type. Thus, in some aspects only differential control is allowed.

In some aspects the average EIRP applied to the base station 140 is limited. Particularly, in some aspects the average EIRP applied to the base station 140 is limited by the resource factor value $\gamma(t)$. In more detail, in order to get a smooth behavior of the limiting resource threshold to limit the average EIRP, it might be rate controlled. That means that the control signal commands adjustments to the limiter, making it increase or decrease, typically in small steps. The dynamics of the actuator mechanism might therefore be determined to be:

$$\dot{\gamma}(t) = u(t),$$

where $\dot{\gamma}(t)$ is the derivative of the resource factor value $\gamma(t)$ and where u(t) is the control signal above expressed in the time domain. The resource just expresses a fractional limitation not to use more than a fraction, as given by $\gamma(t)$, of the total beam gain resources.

In some examples the beamformer is determined per transmission time interval (TTI). One value of the beam width control parameter ρ is then determined per TTI, whereby a value of the beam width control parameter ρ as determined for one TTI is applied in the adjacent TTI following this one TTI.

In some aspects the resource factor value $\gamma(t)$ is set to its minimum value when the value of average EIRP is larger than a threshold value. In more detail, the maximum value of $\gamma(t)$ is 1 since it is to express a fraction of the maximum amount of scheduler resources. There might also be a need to limit its lower value in order to avoid that the dynamic feedback control mechanism reduces it to an unphysical value below 0. The following scheduler threshold limitation might therefore be applied:

$$\gamma_{low} \leq \gamma(t) \leq 1.$$

In some aspects a supervision mechanism is employed for enabling and disabling the proposed controlling average EIRP of the base station 140. Particularly, according to an embodiment, the beam width control parameter ρ is applied to selectively reduce the average EIRP when the momentary EIRP resulting from the beamformer is above a threshold. That is, in some aspects the control in step S102 is selectively enabled and disabled. Further, the resource factor value $\gamma(t)$ might be set to its maximum value when performing the control is enabled.

There could be different ways to determine when to enable and disable the control. In some aspects a comparison to threshold values is made in order to determine when to enable and disable the control. In particular, in some aspects, performing the control (as in step S102) is enabled when the value of the average EIRP is larger than a fractional first threshold value $\delta_1$, and performing the control is disabled when the value of the average EIRP is smaller than a second fractional power threshold value $\delta_2$, where $\delta_2 \leq \delta_1$. In more detail, one scope of the proposed control is to control the averaged EIRP to be below the threshold determined to meet a regulatory requirement. When this is not needed, the proposed control could be disabled, leaving the base station 140 to operate without any scheduler limitation. Therefore, according to an example: 1) Enable the control when $\langle E_{tot} \rangle (t) > \delta_1 E_{max,site}$, and set $\gamma(t)=1$, and 2) Disable the control when $\langle E_{tot} \rangle (t) < \delta_2 E_{max,site}$. In some aspects the values fulfil: $\delta_2 E_{max,site} \leq \langle E_{tot} \rangle^{ref} \leq \delta_1 E_{max,site}$, where $E_{max,site}$ denotes the maximum EIRP of the site comprising the base station 140.

As indicated in FIG. 5, the control loop of the back-off control is a beamforming control loop that uses computed beam gains and information of total transmission power. The beamforming computations can be performed in a digital unit of the radio base station 140, in radio equipment of the radio base station 140, in the control device 200, be divided among at least two of these entities.

In some aspect examples the values of total transmission power are measured at input to the antenna array 170 of the base station 140. In this respect, the total output power of an antenna array 170, over all antenna elements 172a:172d of the antenna array 170, can be measured in the radio equipment, just before the antenna elements 172a:172d of the antenna array 170. In some examples this can be done by couplers that measure the radio signal amplitude at each signal path to an antenna element 172a:!72d. These amplitudes can then be combined into a total output power of the radio equipment, from which the relevant EIRP can be computed by multiplication with the antenna gain. This quantity is denoted $E_{tot}(t)$ In other aspects the values of total transmission power $P_{tot}(t)$ are predicted using information available in the scheduler or elsewhere in baseband.

According to a first example, total power computation is predicted in the digital unit, beamforming computations are performed in the digital unit, and back-off power control functionality is performed in the digital unit (i.e., with the control device 200 integrated with the digital unit of the radio base station 140).

According to a second example, total power is measured in the radio equipment, beamforming computations are performed in the digital unit, and back-off power control functionality is performed in the digital unit (i.e., with the control device 200 integrated with the digital unit of the radio base station 140). This would require information of the total power to be signaled from the radio equipment to the digital unit.

According to a third example, total power is measured in the radio equipment, beamforming computations are performed in the digital unit, and back-off power control functionality is performed in the radio equipment (i.e., with the control device 200 integrated with the radio equipment of the radio base station 140). This would require beam forming information to be signaled from the digital unit to the radio equipment.

According to a fourth example, total power is measured in the radio equipment, beamforming computations are performed in the radio equipment, and back-off power control functionality is performed in the radio equipment (i.e., with the control device 200 integrated with the radio equipment of the radio base station 140).

Simulation results of the herein disclosed control of average EIRP of the radio base station 140 will now be presented with reference to FIGS. 7, 8, 9, and 10. In those figures, the EIRP normalized with the maximum antenna gain, denoted $G_{max}$, is plotted.

Figure 7:
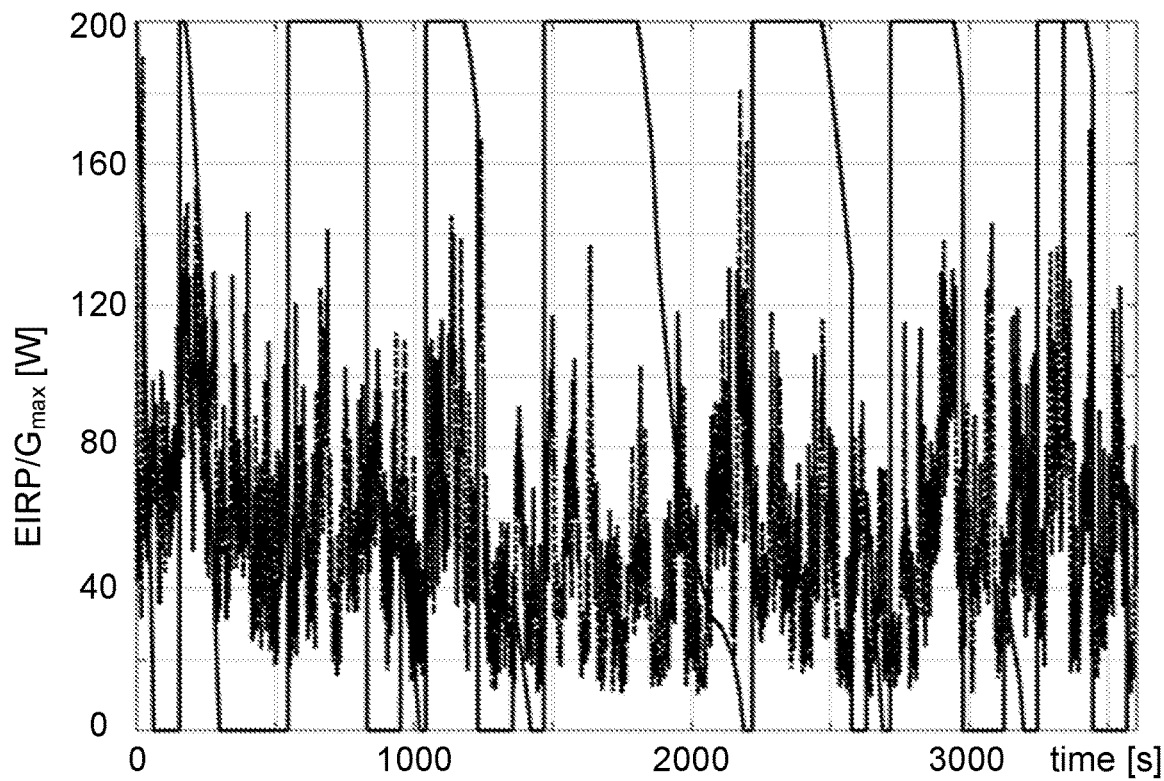
FIGS. 7, 8, 9, 10 show simulation results according to embodiments.
Figure 8:
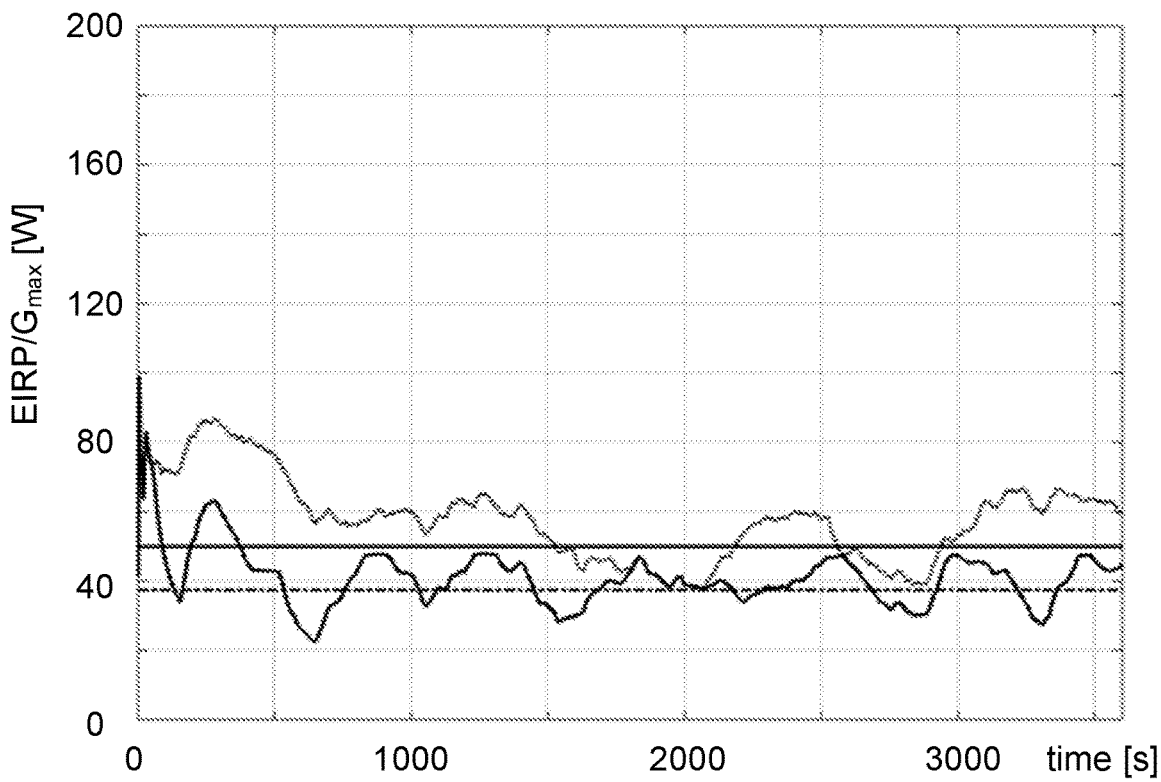

Simulation results for continuous beam gain control are shown in FIGS. 7 and 8. The results in these figures thus correspond to the above disclosed second embodiment where the beam width control parameter p is a continuous function of, the resource factor value $\gamma(t)$. The results in these figures thus illustrate ideal beam gain reduced back-off control. FIG. 7 shows the uncontrolled momentary EIRP (dotted) and the dynamic threshold (solid). The averaging time is 6 minutes, and there are 720 samples in the averaging window (i.e., using a sampling period of 0.5 seconds). FIG. 8 shows the threshold (solid), the reference EIRP for the back-off controller (dashed-dotted), the uncontrolled average EIRP (dotted), and the controlled average EIRP (solid).

Figure 9:
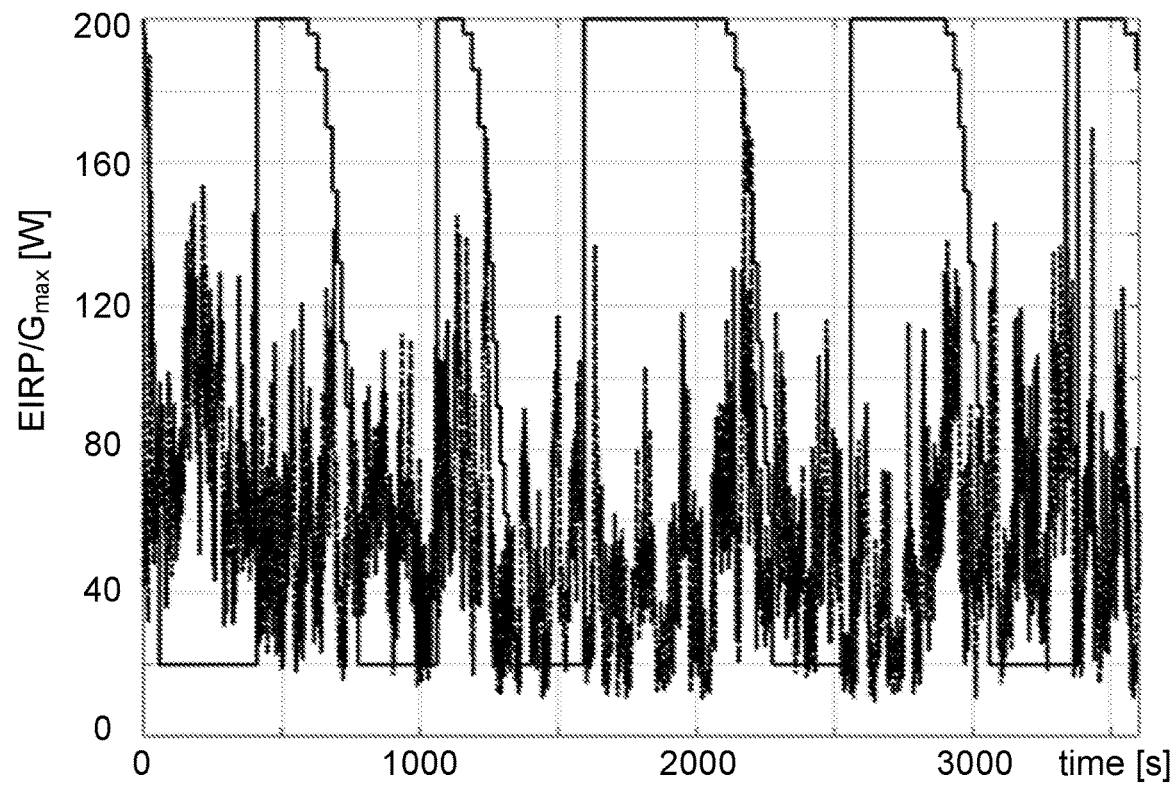
Figure 10:
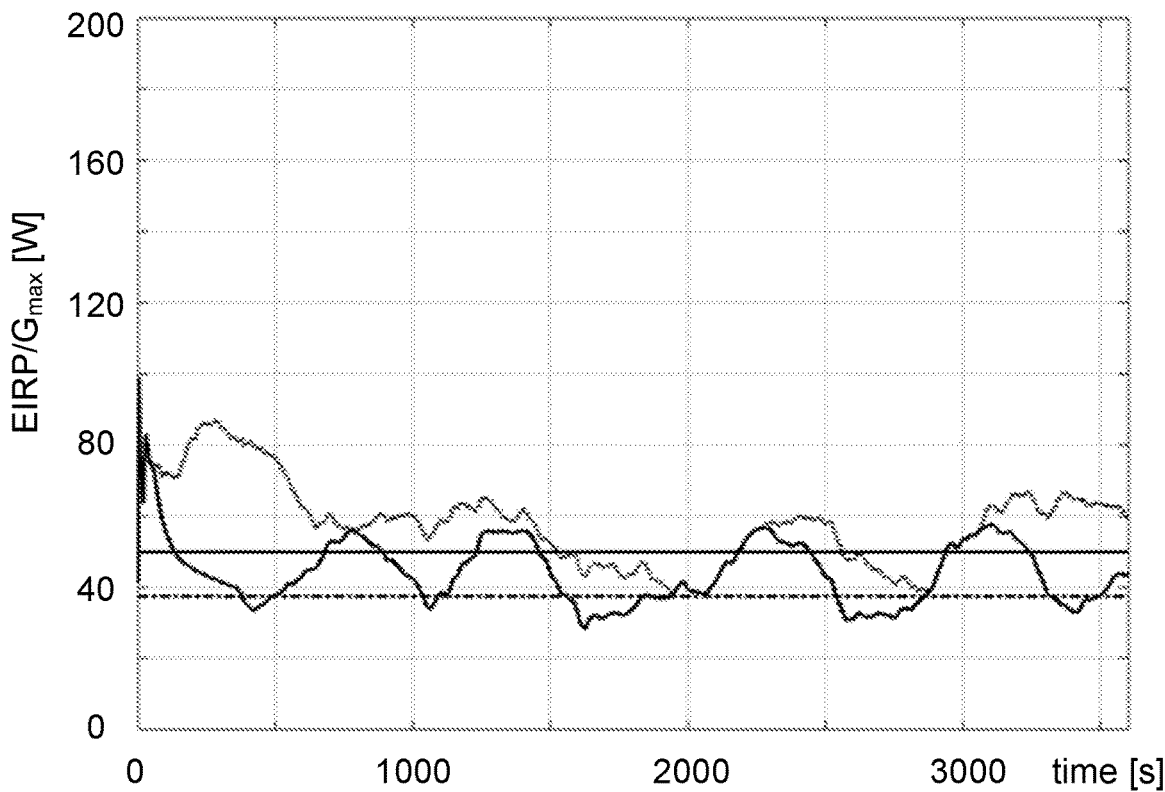

Simulation results for beam gain control by means of tabulated values are shown in FIGS. 9 and 10. The results in these figures thus correspond to the above disclosed first embodiment where the beam width control parameter $\rho$ is found from the resource factor value $\gamma(t)$ by a table look-up. Table 1 was used for the table look-up. When $\gamma(t)$ was in between two values of the table, the lower value was used. This means that a floor(.) operation was used. The intention is to make control pessimistic, to avoid overshoots. The performance is slightly worse than for the continuous beam gain control, however the control loop still performs fairly well, despite the nonlinearity of the table. FIG. 9 shows the uncontrolled momentary power density (dotted) and the dynamic threshold (solid). The averaging time is 6 minutes, and there are 720 samples in the averaging window. FIG. 10 shows the threshold value (solid), the reference EIRP for the back-off controller (dashed-dotted), the uncontrolled average EIRP (dotted), and the controlled average EIRP (solid).

When the herein disclosed control is implemented in a computer, discretization can be used e.g. with the Euler approximation or with the so called Tustin approximation. Such discretization techniques are as such well known in the art.

Figure 11:
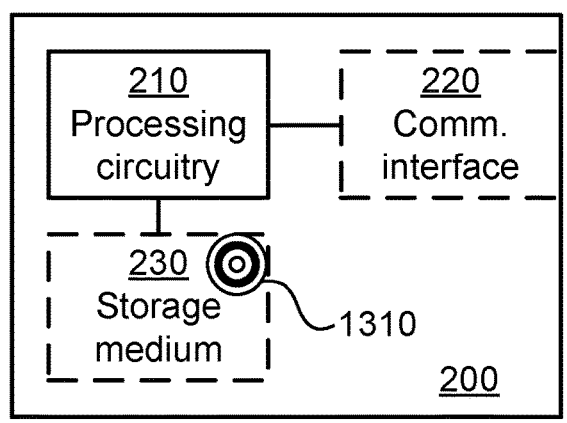
FIG. 11 is a schematic diagram showing functional units of a control device according to an embodiment.

FIG. 11 schematically illustrates, in terms of a number of functional units, the components of a control device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310 (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the control device 200 to perform a set of operations, or steps, as disclosed above. For example, the storage medium 230 may store the set of operations, and the processing circuitry 210 may be configured to retrieve the set of operations from the storage medium 230 to cause the control device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control device 200 may further comprise a communications interface 220 at least configured for communications with other entities, nodes, functions, and devices. As such the communications interface 220 may comprise one or more transmitters and receivers, comprising analogue and digital components. The processing circuitry 210 controls the general operation of the control device 200 e.g. by sending data and control signals to the communications interface 220 and the storage medium 230, by receiving data and reports from the communications interface 220, and by retrieving data and instructions from the storage medium 230. Other components, as well as the related functionality, of the control device 200 are omitted in order not to obscure the concepts presented herein.

Figure 12:
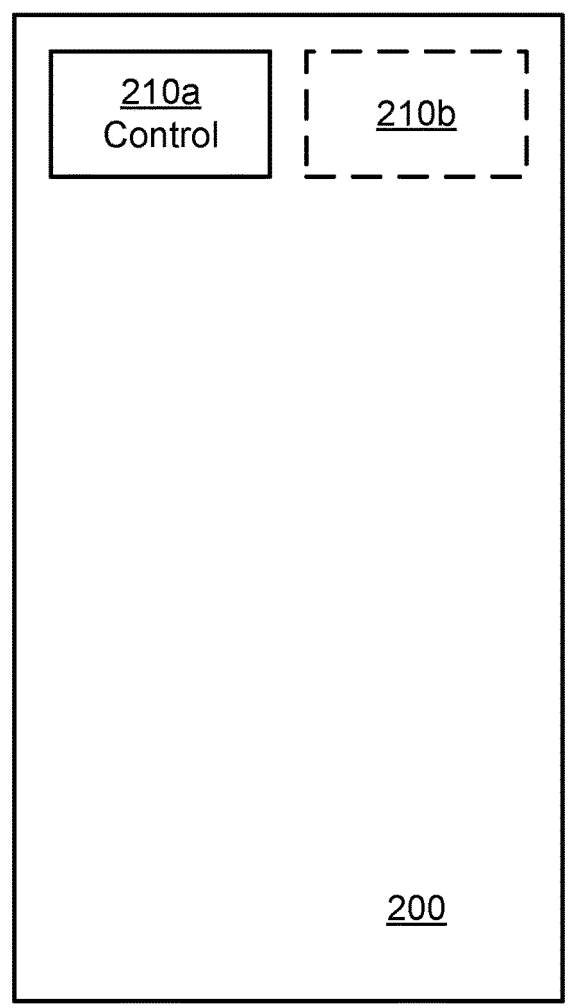
FIG. 12 is a schematic diagram showing functional modules of a control device according to an embodiment.

FIG. 12 schematically illustrates, in terms of a number of functional modules, the components of a control device 200 according to an embodiment. The control device 200 of FIG. 12 comprises a control module 210a configured to perform step S102. The control device 200 of FIG. 12 may further comprise a number of optional functional modules, such as symbolized by functional module 210b. In general terms, each functional module 210a-210b may in one embodiment be implemented only in hardware and in another embodiment with the help of software, i.e., the latter embodiment having computer program instructions stored on the storage medium 230 which when run on the processing circuitry makes the control device 200 perform the corresponding steps mentioned above in conjunction with FIG. 16. It should also be mentioned that even though the modules correspond to parts of a computer program, they do not need to be separate modules therein, but the way in which they are implemented in software is dependent on the programming language used. Preferably, one or more or all functional modules 210a-210b may be implemented by the processing circuitry 210, possibly in cooperation with the communications interface 220 and/or the storage medium 230. The processing circuitry 210 may thus be configured to from the storage medium 230 fetch instructions as provided by a functional module 210a-210b and to execute these instructions, thereby performing any steps as disclosed herein.

The control device 200 may be provided as a standalone device or as a part of at least one further device. For example, the control device 200 may be provided in a node of the radio access network 110 or in a node of the core network 120. Alternatively, functionality of the control device 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time.

Thus, a first portion of the instructions performed by the control device 200 may be executed in a first device, and a second portion of the of the instructions performed by the control device 200 may be executed in a second device; the herein disclosed embodiments are not limited to any particular number of devices on which the instructions performed by the control device 200 may be executed. Hence, the methods according to the herein disclosed embodiments are suitable to be performed by a control device 200 residing in a cloud computational environment. Therefore, although a single processing circuitry 210 is illustrated in FIG. 11 the processing circuitry 210 may be distributed among a plurality of devices, or nodes. The same applies to the functional modules 210a-210b of FIG. 12 and the computer program 1320 of FIG. 13.

Figure 13:
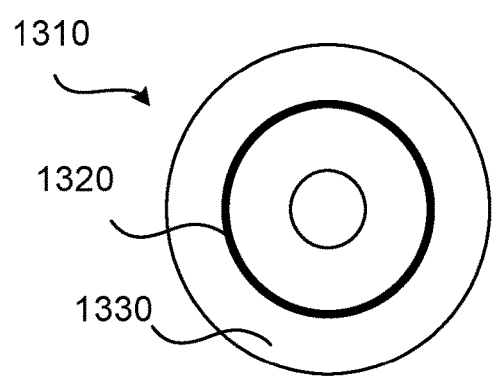
FIG. 13 shows one example of a computer program product comprising computer readable storage medium according to an embodiment.

FIG. 13 shows one example of a computer program product 1310 comprising computer readable storage medium 1330. On this computer readable storage medium 1330, a computer program 1320 can be stored, which computer program 1320 can cause the processing circuitry 210 and thereto operatively coupled entities and devices, such as the communications interface 220 and the storage medium 230, to execute methods according to embodiments described herein. The computer program 1320 and/or computer program product 1310 may thus provide means for performing any steps as herein disclosed.

In the example of FIG. 13, the computer program product 1310 is illustrated as an optical disc, such as a CD (compact disc) or a DVD (digital versatile disc) or a Blu-Ray disc. The computer program product 1310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320 is here schematically shown as a track on the depicted optical disk, the computer program 1320 can be stored in any way which is suitable for the computer program product 1310.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for controlling average Equivalent Isotropic Radiated Power (EIRP) of a radio base station, wherein the method being performed by a control device, the method comprising:
performing control of average EIRP of the radio base station according to a back-off power control loop,
wherein, in the back-off power control loop, a beam width control parameter $\rho$ is used to vary the average EIRP generated by an antenna array of the radio base station, whereby the average EIRP is selectively reduced based on the beam width control parameter $\rho$,
wherein the radio base station is configured to perform beamforming using a beamformer, in which the beamformer is defined by a beam forming matrix W,
wherein reciprocity assisted transmission (RAT) is applied, based on an estimated channel matrix $\hat{H}$, to determine the beam forming matrix W, and
wherein weighting of the beam forming matrix W is accomplished by weighting of the estimated channel matrix $\hat{H}$ with the beam width control parameter $\rho$.

2. The method according to claim 1, wherein the beam width control parameter $\rho$ is applied to selectively reduce the average EIRP when a momentary EIRP resulting from the beamformer is above a power threshold.

3. The method according to claim 1, wherein the beam width control parameter $\rho$ is used to weigh the beam forming matrix W, and thereby to vary maximum power density.

4. The method according to claim 1, wherein application of the beam width control parameter $\rho$ to vary the average EIRP gives rise to a beam gain varying actuator that provides an actuator effect to vary the average EIRP.

5. The method according to claim 4, wherein the beam gain varying actuator is implemented by weighting the beam forming matrix W.

6. The method according to claim 1, wherein the estimated channel matrix as being weighted by the beam width control parameter $\rho$ is denoted $\tilde{H}$ and is determined as:

$$\tilde{H} = P \circ \hat{H},$$

where $\circ$ is a Hadamard matrix operator, and P is a matrix defined from $\rho$.

7. The method according to claim 6, wherein P is a matrix defined from $\rho$ as:

$$P = \begin{pmatrix} \rho^0 & \rho^1 & \cdots & \rho^{Ntx} \\ \vdots & \vdots & \ddots & \vdots \\ \rho^0 & \rho^1 & \cdots & \rho^{Ntx} \end{pmatrix},$$

where the estimated channel matrix $\hat{H}$ has dimension Nrx-by-Ntx.

8. The method according to claim 6, wherein P is a matrix consisting of elements that have values that are powers of $|\rho|<1$, or powers of $|\rho|>1$a, or a mix of values that are powers of $|\rho|<1$ and $|\rho|>1$.

9. The method according to claim 1, wherein performing the control involves determining a resource factor value according to which the average EIRP of the radio base station is to be limited.

10. The method according to claim 9, wherein the resource factor value defines a momentary beam gain reduction value.

11. The method according to claim 10, wherein the beam width control parameter $\rho$ is dependent on the resource factor value.

12. The method according to claim 11, wherein the beam width control parameter $\rho$ is found from the resource factor value by a table look-up.

13. The method according to claim 11, wherein the beam width control parameter $\rho$ is identical to, or a continuous function of, the resource factor value.

14. The method according to claim 1, wherein the beamformer is determined per transmission time interval (TTI) and wherein one value of the beam width control parameter $\rho$ is determined per TTI, whereby a value of the beam width control parameter $\rho$ as determined for one TTI is applied in an adjacent TTI following said one TTI.

15. The method according to claim 1, wherein the control is of proportional-derivative (PD) type or derivative (D) type.

16. A control device for controlling average Equivalent Isotropic Radiated Power (EIRP) of a radio base station, the control device comprising:
processing circuitry; and
a storage medium containing instructions which, when executed by the processing circuitry, cause the control device to:
perform control of average EIRP. of the radio base station according to a back-off power control loop,
wherein, in the back-off power control loop, a beam width control parameter p is used to vary the average EIRP generated by an antenna array of the radio base station, whereby the average EIRP is selectively reduced based on the beam width control parameter $\rho$,
wherein the radio base station is configured to perform beamforming using a beamformer, in which the beamformer is defined by a beam forming matrix W,
wherein reciprocity assisted transmission (RAT) is applied, based on an estimated channel matrix $\hat{H}$, to determine the beam forming matrix W, and
wherein weighting of the beam forming matrix W is accomplished by weighting of the estimated channel matrix $\hat{H}$ with the beam width control parameter $\rho$.

17. A non-transitory computer-readable storage medium having stored thereon a computer program which, when executed by a computer, cause a control device to perform operations for controlling average Equivalent Isotropic Radiated Power (EIRP) of a radio base station comprising:
performing control of average EIRP of the radio base station according to a back-off power control loop,
wherein, in the back-off power control loop, a beam width control parameter $\rho$ is used to vary the average EIRP generated by an antenna array of the radio base station, whereby the average EIRP is selectively reduced based on the beam width control parameter $\rho$,
wherein the radio base station is configured to perform beamforming using a beamformer, in which the beamformer is defined by a beam forming matrix W.
wherein reciprocity assisted transmission (RAT) is applied, based on an estimated channel matrix $\hat{H}$, to determine the beam forming matrix W, and
wherein weighting of the beam forming matrix W is accomplished by weighting of the estimated channel matrix $\hat{H}$ with the beam width control parameter $\rho$.

* * * * *